United States Patent [19]

Moisin

[11] Patent Number: 6,100,648
[45] Date of Patent: Aug. 8, 2000

[54] BALLAST HAVING A RESONANT FEEDBACK CIRCUIT FOR LINEAR DIODE OPERATION

[75] Inventor: Mihail S. Moisin, Brookline, Mass.

[73] Assignee: Electro-Mag International, Inc.

[21] Appl. No.: 09/303,073

[22] Filed: Apr. 30, 1999

[51] Int. Cl.[7] .................................................. H05B 37/02
[52] U.S. Cl. ..................... 315/224; 315/209 R; 315/244; 315/276; 315/DIG. 2; 315/DIG. 5
[58] Field of Search ................................ 315/224, 209 R, 315/244, 276, 282, 239, 200 R, 205, DIG. 2, DIG. 5, DIG. 7; 323/226, 247, 273; 363/37, 89

[56] References Cited

U.S. PATENT DOCUMENTS

| | | | |
|---|---|---|---|
| 3,808,481 | 4/1974 | Rippel | 318/139 |
| 4,115,729 | 9/1978 | Young et al. | 322/86 |
| 4,164,785 | 8/1979 | Young et al. | 363/50 |
| 4,270,164 | 5/1981 | Wyman et al. | 363/56 |
| 4,415,839 | 11/1983 | Lesea | 315/308 |
| 4,423,363 | 12/1983 | Clark et al. | 318/375 |
| 4,480,298 | 10/1984 | Fry | 363/28 |
| 4,489,373 | 12/1984 | du Parc | 363/56 |
| 4,507,698 | 3/1985 | Nilssen | 361/42 |
| 4,525,648 | 6/1985 | De Bijl et al. | 315/224 |
| 4,572,988 | 2/1986 | Handler et al. | 315/209 R |
| 4,608,958 | 9/1986 | Sakakibara et al. | 123/605 |
| 4,618,810 | 10/1986 | Hagerman et al. | 318/803 |
| 4,624,334 | 11/1986 | Kelledes et al. | 180/79.1 |
| 4,675,576 | 6/1987 | Nilssen | 315/242 |
| 4,682,083 | 7/1987 | Alley | 315/307 |
| 4,684,851 | 8/1987 | Van Meurs | 315/224 |
| 4,712,045 | 12/1987 | Van Meurs | 315/224 |
| 4,783,728 | 11/1988 | Hoffman | 363/37 |
| 4,818,917 | 4/1989 | Vest | 315/171 |
| 4,864,486 | 9/1989 | Spreen | 363/126 |
| 4,866,586 | 9/1989 | Suko | 363/5 |
| 4,870,327 | 9/1989 | Jorgensen | 315/307 |
| 4,899,382 | 2/1990 | Gartner | 379/413 |
| 4,952,853 | 8/1990 | Archer | 318/254 |
| 4,991,051 | 2/1991 | Hung | 361/57 |
| 5,003,231 | 3/1991 | Perper | 315/291 |
| 5,004,955 | 4/1991 | Nilssen | 315/119 |
| 5,014,305 | 5/1991 | Moisin | 379/402 |
| 5,027,032 | 6/1991 | Nilssen | 315/103 |
| 5,052,039 | 9/1991 | Moisin | 379/402 |
| 5,063,339 | 11/1991 | Orii et al. | 318/696 |
| 5,081,401 | 1/1992 | Moisin | 315/324 |
| 5,124,619 | 6/1992 | Moisin et al. | 315/219 |
| 5,138,233 | 8/1992 | Moisin et al. | 315/187 |
| 5,138,234 | 8/1992 | Moisin | 315/209 R |
| 5,138,236 | 8/1992 | Bobel et al. | 315/209 R |
| 5,144,195 | 9/1992 | Konopka et al. | 315/94 |

(List continued on next page.)

FOREIGN PATENT DOCUMENTS

| | | |
|---|---|---|
| 01185132 | 7/1989 | European Pat. Off. . |
| 0522266 | 5/1992 | European Pat. Off. . |
| 0460641 | 12/1997 | European Pat. Off. . |
| 4010435 | 3/1990 | Germany . |
| 4032664 | 10/1990 | Germany . |
| 2204455 | 11/1988 | United Kingdom . |
| WO9422209 | 9/1994 | WIPO . |
| WO9535646 | 12/1995 | WIPO . |

OTHER PUBLICATIONS

"Simple Dimming Circuit for Fluorescent Lamp", IBM Technical Disclosure Bulletin, vol. 34, No., 4A, Sep. 1991, pp. 109–111, XP000210848.

"Resonant Power Converters", Marian K. Kazimierczuk et al., 1995, pp. 332–333.

Primary Examiner—Haissa Philogene
Attorney, Agent, or Firm—Nutter, McClennen & Fish, LLP

[57] ABSTRACT

A circuit, such as a ballast circuit, includes a resonant feedback signal from an inverter that provides substantially linear operation of rectifying diodes. In one embodiment, capacitors coupled in series with respective lamps resonate with a first winding of a feedback transformer so as to generate a feedback signal on a second winding of the transformer. The feedback signal is effective to produce substantially linear operation of the rectifying diodes.

23 Claims, 5 Drawing Sheets

U.S. PATENT DOCUMENTS

| | | | |
|---|---|---|---|
| 5,148,087 | 9/1992 | Moisin et al. | 315/291 |
| 5,173,643 | 12/1992 | Sullivan et al. | 315/276 |
| 5,177,408 | 1/1993 | Marques | 315/291 |
| 5,191,263 | 3/1993 | Konopka | 315/209 R |
| 5,216,332 | 6/1993 | Nilssen | 315/224 |
| 5,220,247 | 6/1993 | Moisin | 315/209 R |
| 5,223,767 | 6/1993 | Kulka | 315/209 R |
| 5,256,939 | 10/1993 | Nilssen | 315/244 |
| 5,291,382 | 3/1994 | Cohen | 363/16 |
| 5,309,066 | 5/1994 | Ditlevsen | 315/205 |
| 5,313,143 | 5/1994 | Vila-Maso et al. | 315/209 R |
| 5,315,533 | 5/1994 | Stich et al. | 364/480 |
| 5,332,951 | 7/1994 | Turner et al. | 315/209 R |
| 5,334,912 | 8/1994 | Counts | 315/119 |
| 5,390,231 | 2/1995 | Hung et al. | 379/2 |
| 5,394,064 | 2/1995 | Ranganath et al. | 315/209 R |
| 5,399,943 | 3/1995 | Chandrasekaran | 315/219 |
| 5,416,388 | 5/1995 | Shackel | 315/219 |
| 5,432,817 | 7/1995 | Hormel et al. | 375/257 |
| 5,434,477 | 7/1995 | Crouse et al. | 315/209 R |
| 5,434,480 | 7/1995 | Bobel | 315/224 |
| 5,444,333 | 8/1995 | Lau | 315/94 |
| 5,446,365 | 8/1995 | Nomura et al. | 320/14 |
| 5,481,160 | 1/1996 | Nilssen | 315/209 R |
| 5,493,180 | 2/1996 | Bezdon et al. | 315/91 |
| 5,504,398 | 4/1996 | Rothenbuhler | 315/209 R |
| 5,515,433 | 5/1996 | Chen | 379/398 |
| 5,519,289 | 5/1996 | Katyl et al. | 315/224 |
| 5,563,479 | 10/1996 | Suzuki | 318/139 |
| 5,574,335 | 11/1996 | Sun | 315/119 |
| 5,579,197 | 11/1996 | Mengelt et al. | 361/93 |
| 5,583,402 | 12/1996 | Moisin et al. | 315/307 |
| 5,608,295 | 3/1997 | Moisin | 315/247 |
| 5,608,595 | 3/1997 | Gourab et al. | 361/79 |
| 5,638,266 | 6/1997 | Horie et al. | 363/132 |
| 5,684,683 | 11/1997 | Divan et al. | 33/65 |
| 5,686,799 | 11/1997 | Moisin et al. | 315/307 |
| 5,691,606 | 11/1997 | Moisin et al. | 315/307 |
| 5,798,617 | 8/1998 | Moisin | 315/247 |
| 5,821,699 | 10/1998 | Moisin | 315/291 |
| 5,825,136 | 10/1998 | Rudolph | 315/291 |
| 5,831,396 | 11/1998 | Rudolph | 315/307 |
| 5,866,993 | 2/1999 | Moisin | 315/307 |
| 5,925,986 | 7/1999 | Moisin | 315/247 |
| 6,028,399 | 2/2000 | Moisin | 315/224 |

BALLAST HAVING A RESONANT FEEDBACK CIRCUIT FOR LINEAR DIODE OPERATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The invention relates generally to rectifier circuits, and more particularly, to circuits having a feedback signal for producing substantially linear operation of rectifying diodes.

There are many types of circuits for providing power to a load. Many such circuits include a rectifier circuit for receiving an alternating current (AC) signal and providing a direct current (DC) output signal. In one application, a ballast circuit for energizing a fluorescent lamp includes a rectifier circuit having an input coupled to a relatively low frequency AC power source and a DC output coupled to an inverter circuit. The inverter circuit applies a relatively high frequency AC signal to the lamp that is effective to cause a predetermined level of current to flow through the lamp and thereby produce visible light.

Rectifier circuits generally contain one or more rectifying diodes coupled so as to form input (AC) and output (DC) terminals. In operation, each of the rectifying diodes is conductive for a part of the AC input signal. For example, a first rectifying diode may be conductive for a part of the positive portion of the AC input signal and a second rectifying diode may be conductive for a part of the negative portion. One problem associated with this arrangement is that the diodes which form the rectifier circuit do not operate in a linear manner. Typically, the rectifying diodes are only forward biased, i.e., conductive, when the AC input signal is at or near its peak value. The non-linear operation of the rectifying diodes has a negative impact on the efficiency of the circuit since only a limited amount of power from the AC power source is available to the circuit. Further, the total harmonic distortion (THD) and the power factor (PF) of the circuit are also adversely affected.

It would, therefore, be desirable to provide a circuit including a rectifier having rectifying diodes that are operated in a substantially linear manner.

SUMMARY OF THE INVENTION

The present invention provides a circuit that generates a feedback signal for providing substantially linear operation of diodes that rectify an AC input signal. Although the invention is primarily shown and described with reference to ballast circuits, it is understood that many other applications are possible, such as electric motors and regulators.

In one embodiment, a circuit, such as a ballast circuit, includes a full bridge rectifier for receiving a relatively low frequency input AC signal and providing positive and negative DC signals to an inverter. The inverter generates a relatively high frequency AC signal for energizing a plurality of loads, fluorescent lamps for example. Each load is connected in series with a respective one of a plurality of circuit elements, such as capacitors. A first winding of a feedback transformer is adapted for coupling to the lamps such that during operation of the circuit, the first winding of the feedback transformer resonates with the capacitors. A corresponding feedback signal is generated on a second winding of the feedback transformer, which is coupled to the rectifying diodes in the rectifier via feedback signal path. The feedback signal produces substantially linear operation of the rectifying diodes.

In another embodiment, a circuit includes a voltage doubling type circuit for receiving an AC input signal and providing DC energy to an inverter that energizes one or more loads. The voltage doubling circuit includes first and second rectifying diodes coupled end-to-end across the DC output terminals of the circuit. The voltage doubling circuit energizes an inverter circuit for energizing a plurality of loads, such as lamps. Each of the lamps is coupled in series with a respective charge-storing circuit element, such as a capacitor. The lamp/capacitor series circuit paths are coupled to a first winding of a feedback transformer. A feedback signal path extending from a second winding of the feedback transformer is connected to a point between the rectifying diodes. A feedback signal generated on the feedback signal path by the feedback transformer second winding is effective to produce substantially linear operation of the rectifying diodes.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
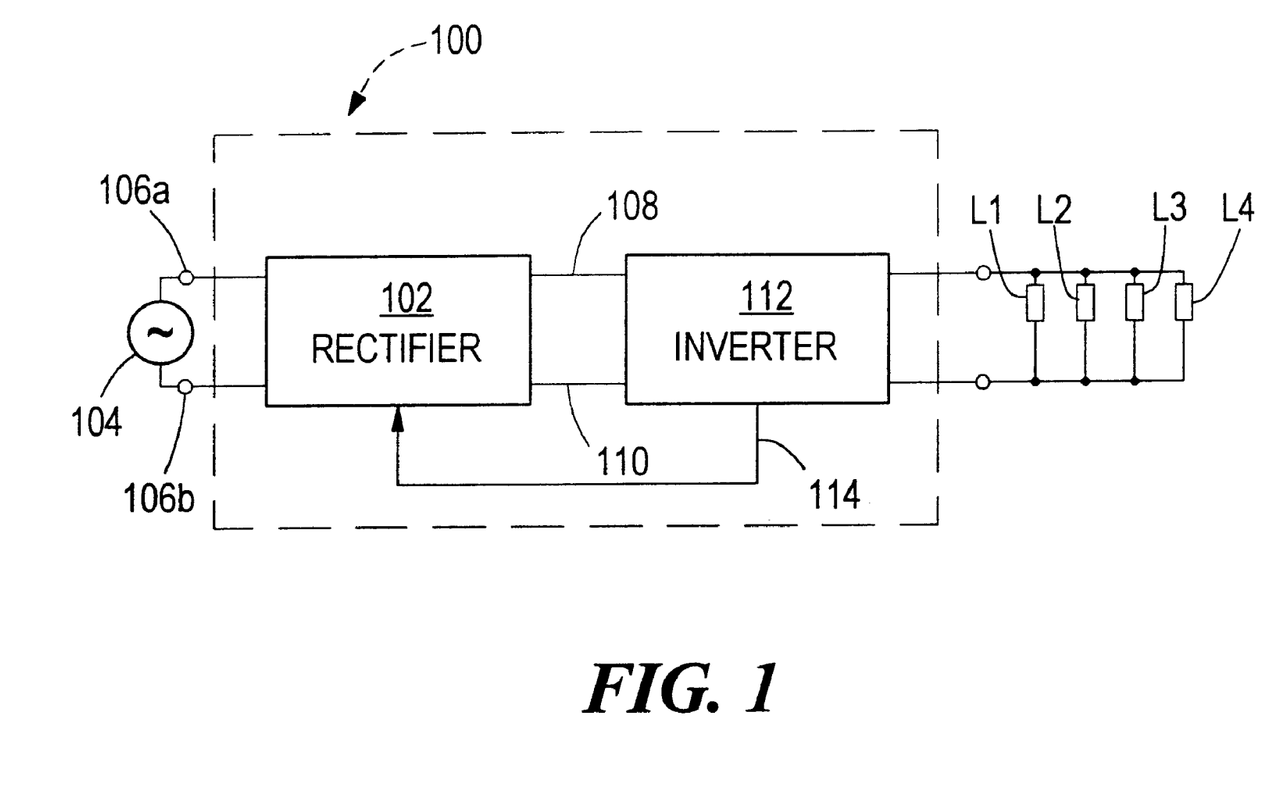
FIG. 1 is a schematic representation of a circuit having a feedback signal for providing substantially linear operation of rectifying diodes in accordance with the present invention.

FIG. 1 shows a ballast 100 for providing substantially linear operation of diodes for rectifying an AC signal in accordance with the present invention. The ballast 100 includes a rectifier 102 for receiving an AC signal from an energy source 104 via first and second input terminal 106a,b. The rectifier 102 provides DC signals to positive and negative voltage rails 108,110 of an inverter 112. The inverter 112 energizes a series of lamps L1–4, fluorescent bulbs for example, with an AC signal that is effective to regulate current through the lamps L1–4 such that they emit light. A relatively high frequency feedback signal that flows from the inverter 112 to the rectifier 102 via a feedback path 114 is effective to periodically bias the rectifying diodes to a conductive state such that they operate in a substantially linear manner.

Figure 2:
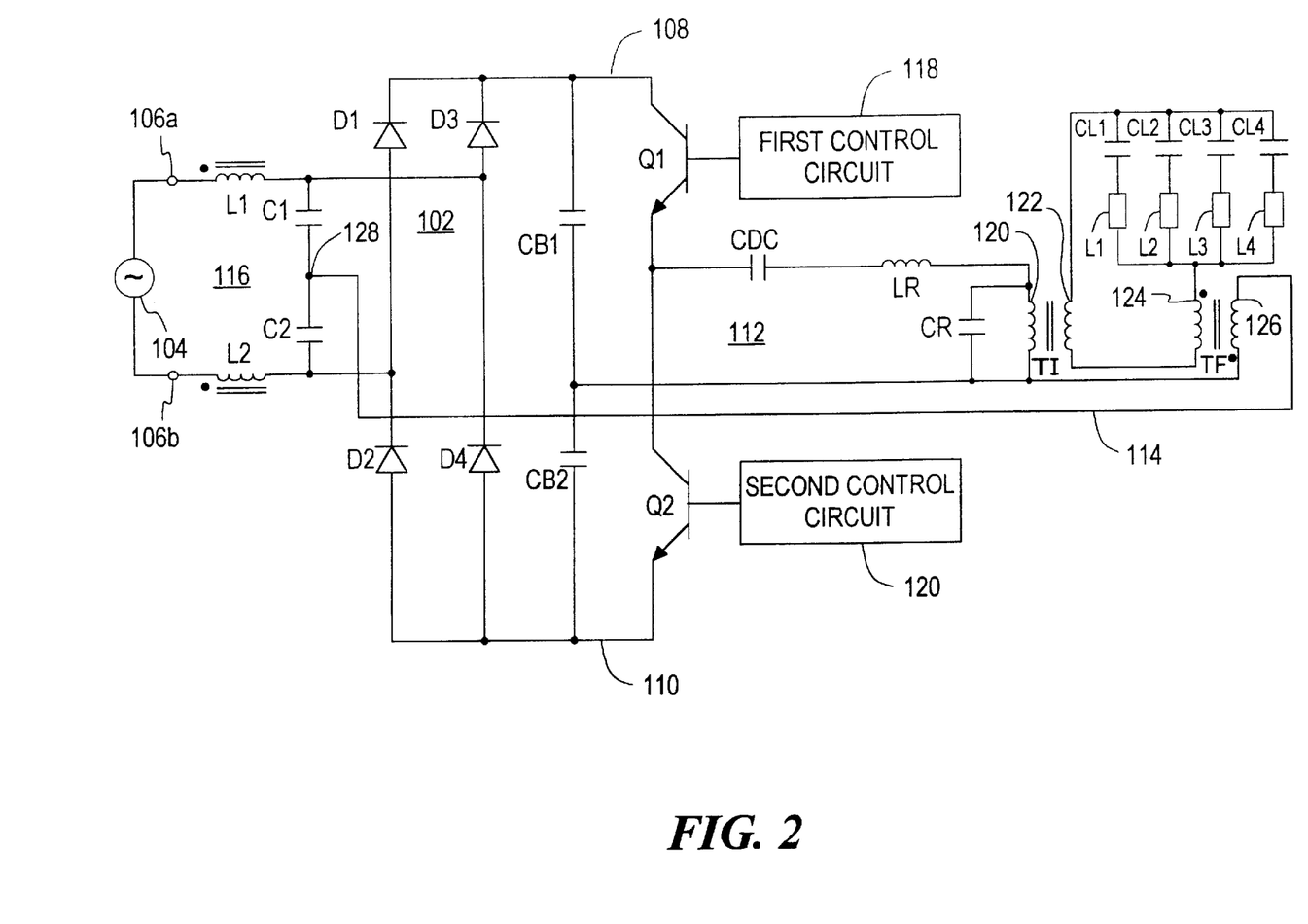
FIG. 2 is a circuit diagram of an exemplary implementation of the circuit of FIG. 1.

FIG. 2 shows an exemplary embodiment of the ballast 100 of FIG. 1. The rectifier 102 includes an EMI input stage 116 for filtering the incoming AC signal from the energy source 104. The input stage 116 includes first and second inductors L1,L2 that are inductively coupled with each other in a common mode arrangement, which is indicated by conventional dot notation, and first and second capacitors C1,C2, which are coupled end-to-end across the first and second inductors L1, L2. The rectifier 102 further includes four diodes D1–4 coupled in a full bridge configuration. More particularly, first and second diodes D1,D2 are coupled end-to-end across the output terminals of the rectifier, i.e., the positive and negative voltage rails 108,110 of the inverter. The third and fourth diodes D3,D4 are also coupled end-to-end across the rectifier output terminals. The rectifier 102 receives the relatively low frequency, e.g., 60 Hz, AC signal from the energy source 104 and provides DC signals on the positive and negative rails 108,110 so as to energize the inverter 112.

The inverter 112 receives the DC signals from the rectifier and provides a relatively high frequency AC signal to the lamps L1–4 that cause them to emit light. During normal operation, the applied AC signal causes a predetermined amount of current to flow through the lamps L1–4 at a characteristic voltage drop. It is understood that the inverter 112 can have a variety of configurations and can energize many different types of lamps. For example, the inverter can have a half bridge configuration, a full bridge arrangement, or other topologies, such as that disclosed in co-pending and commonly assigned U.S. patent application Ser. No. 09/215, 070, filed on Dec. 18, 1998, which is incorporated herein by reference. In addition, the number and type of lamps driven by the inverter can vary. In an exemplary application, the inverter 112 energizes from one to four fluorescent lamps, such as industry standard four foot T8 lamps.

In the exemplary embodiment shown in FIG. 2, the inverter 112 includes first and second switching elements Q1,Q2 coupled in a halfbridge configuration. It is understood that the switching elements Q1,Q2 can be selected from a wide variety of components known to one of ordinary skill in the art, such as transistors, e.g., BJTs and FETs. The first and second switching elements Q1,Q2, which are shown as bipolar junction transistors, are coupled in series across the positive and negative voltage rails 108,110 of the inverter. The conduction state of the first switching element Q1 is controlled by a first control circuit 118 and the conduction state of the second switching element Q2 is controlled by a second control circuit 120. Circuits for controlling the conduction state of the inverter switching elements are well known to one of ordinary skill in the art. First and second bridge capacitors CB1,CB2 are connected in series across the positive and negative rails 108,110 of the inverter.

An optional DC-blocking capacitor CDC has one end coupled to a point between the first and second switching elements Q1,Q2 and the other end coupled to a resonant inductive element LR. A resonant capacitor CR and a primary winding 120 of an isolation transformer TI are coupled in parallel between the resonant inductive element LR and a point between the bridge capacitors CB1,CB2. As known to one of ordinary skill in the art, the first and second switching elements Q1,Q2 are alternately conductive for resonant operation of the inverter. More particularly, the first switching element Q1 is conductive for a first halfcycle as current flows from the resonant inductive element LR to the isolation transformer T1, and the second switching element Q2 is conductive for the second half cycle as current flows in the opposite direction. The impedances of the circuit components, such as the resonant inductor LR and the resonant capacitor CR, determine the characteristic resonant frequency of the inverter. Resonant operation of the inverter is effective to provide an AC signal on the first winding 120 of the isolation transformer TI that ultimately energizes the lamps L1–4.

The resultant signal on the second winding 122 of the isolation transformer TI is effective to cause a predetermined current to flow through the lamps L1–4. As known to one of ordinary skill in the art, the isolation transformer TI isolates the resonant current from the lamp terminals so as to limit the lamp terminal current to a predetermined level, as required by certain safety requirements. In an exemplary embodiment, each of the four lamps L1–4 is connected in series with a respective lamp capacitor CL1–4 between the second winding 122 of the isolation transformer TI and a first winding 124 of a feedback transformer TF. A second winding 126 of the feedback transformer TF is coupled between the first winding 120 of the isolation transformer TI and a point 128 between the first and second capacitors C1,C2.

In operation, resonant operation of the inverter 112 produces an AC signal of desired frequency on the first winding 120 of the isolation transformer TI, which induces a corresponding signal on the second winding 122 of the transformer TI. This signal energizes the lamps L1–4 such that a predetermined current flows through the lamps at a characteristic voltage drop.

As current flows through the lamps L1–4, the lamp capacitors CL1–4 resonate in series with the first winding 124 of the feedback transformer TF. This resonance generates a corresponding signal on the second winding 126 of the feedback transformer TF that is fed back to the point 128 between the first and second capacitors C1,C2 via the feedback path 114. The feedback signal has a voltage that is sufficient to forward bias the rectifying diodes D1–4 so as to provide linear operation of the diodes D1–4.

Figure 3:
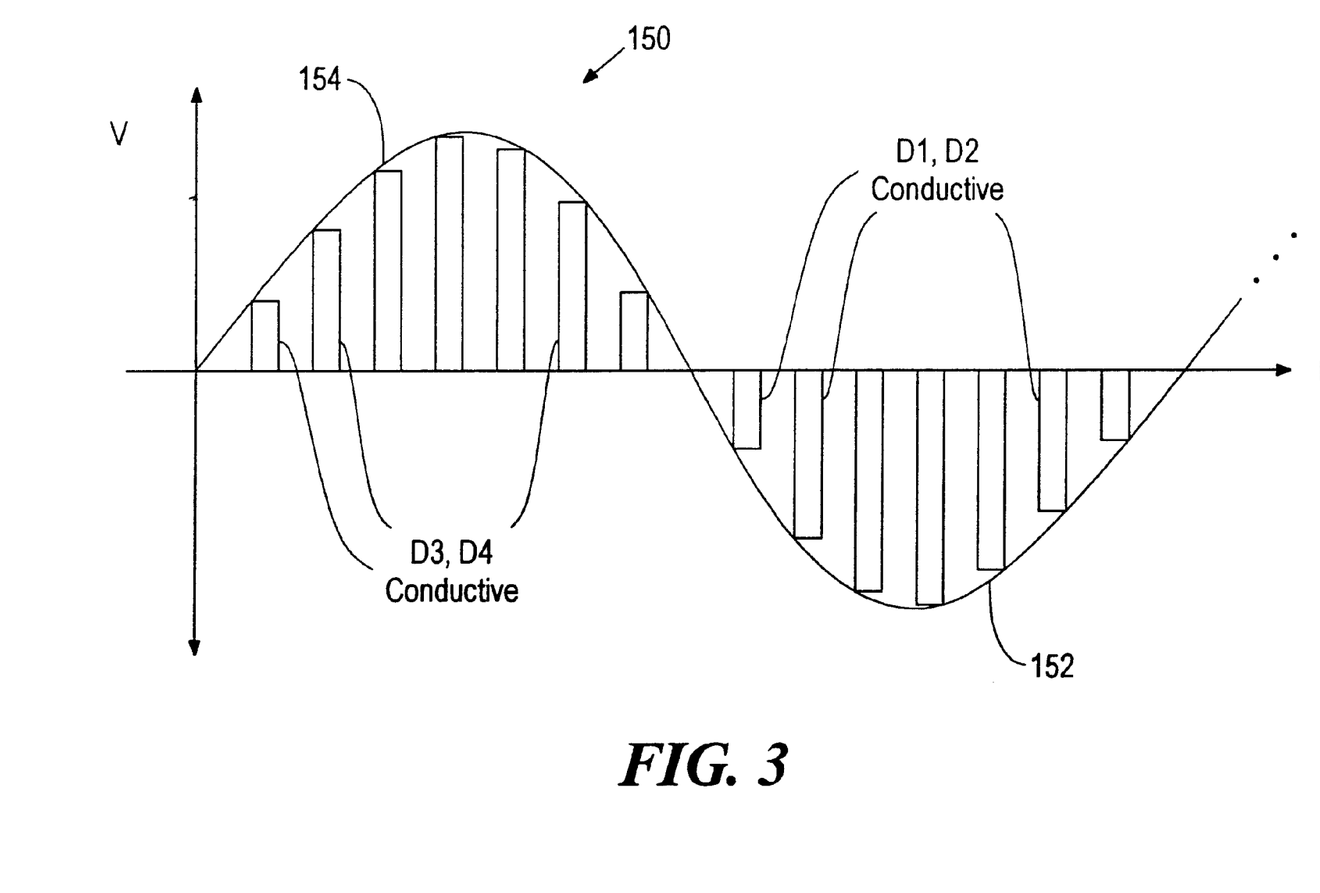
FIG. 3 is a graphical representation showing the conduction state of the rectifying diodes in relation to an input signal.

FIG. 3, in combination with FIG. 2, shows an exemplary relationship between the conduction state of the rectifying diodes D1–4, which corresponds to the relatively high frequency of the feedback signal, and the relatively low frequency input AC signal 150. The relatively high frequency of the AC signal generated by the inverter 112 is effective to cause the pairs diodes (D1,D2, and D3,D4) to become conductive many times during each half cycle of the AC input signal, e.g., 60 Hz, 110 volt signal. In an exemplary embodiment, the first and second diodes D1,D2 are periodically conductive during the negative halfcycle 152 of the AC input signal and the third and fourth diodes D3,D4 are periodically conductive during the positive half cycle 154. This results in substantially linear operation of the rectifying diodes D1–4.

Figure 4:
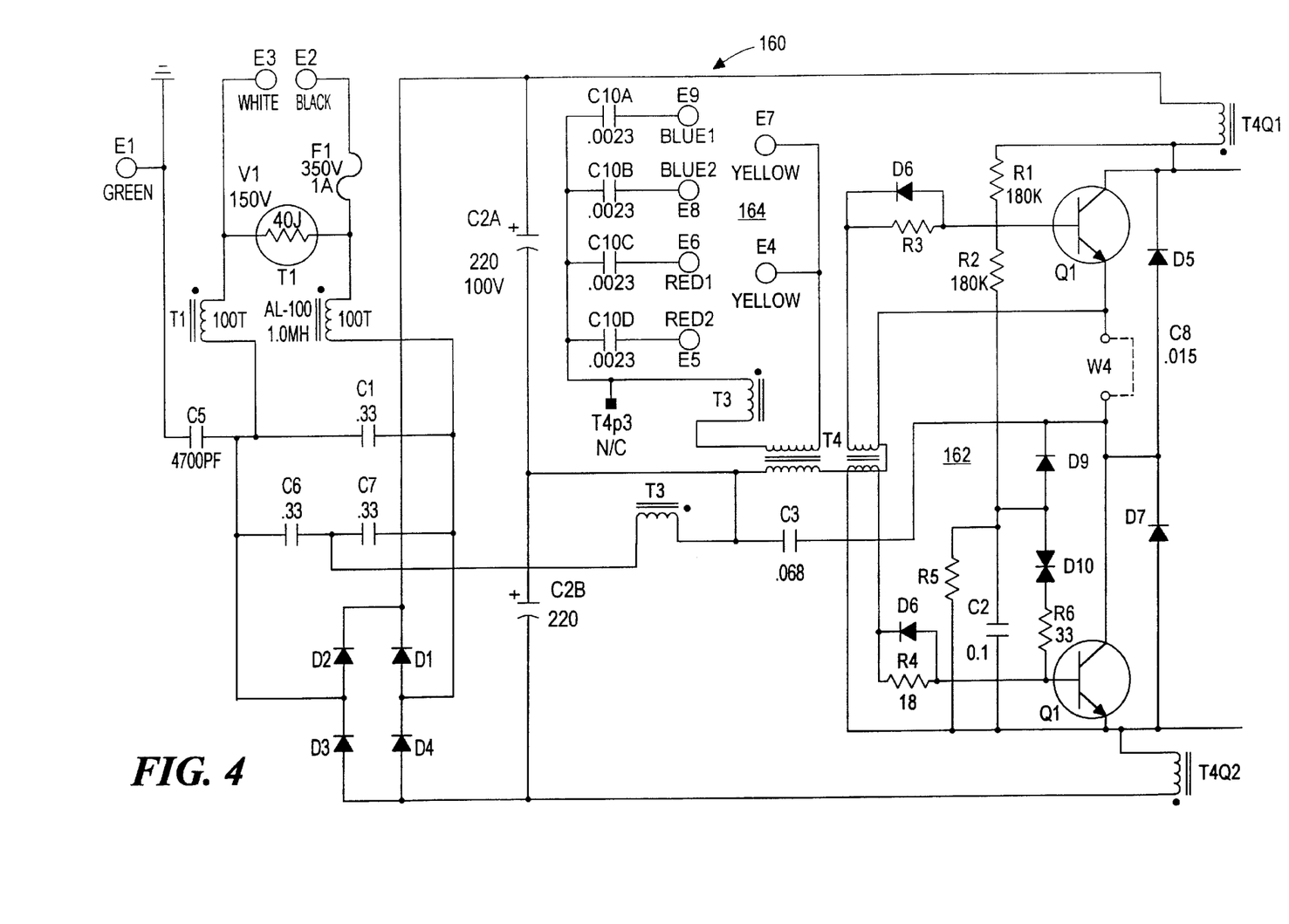
FIG. 4 is a circuit diagram showing further details of the circuit of FIG. 2.

FIG. 4 shows a more detailed circuit diagram 160 of the circuit of FIG. 2, including a startup circuit 162, a lamp terminal wiring diagram 164, and transformer windings T4Q1,T4Q2 coupled to the switching elements Q1,Q2. The circuit 160 further includes exemplary component values, which can be readily modified by one of ordinary skill in the art. The startup circuit 162 includes capacitor C2 and diac D10, which combine to initiate resonant circuit operation. More particularly, and as well known to one of ordinary skill in the art, the start up capacitor C2 initially charges until the voltage triggers the diac D10 to bias the second switching element Q2 to the conductive state and thereby start operation of the inverter. The lamp wiring diagram 164 includes industry convention to indicate respective yellow, blue, and red terminals for a four T8 lamp configuration, as shown. And the transformer windings T4Q1,T4Q2, which are inductively coupled to resonant inductor T4 and connected to respective switching elements Q1,Q2, are effective to isolate the load from the line and to drive the inverter.

Figure 5:
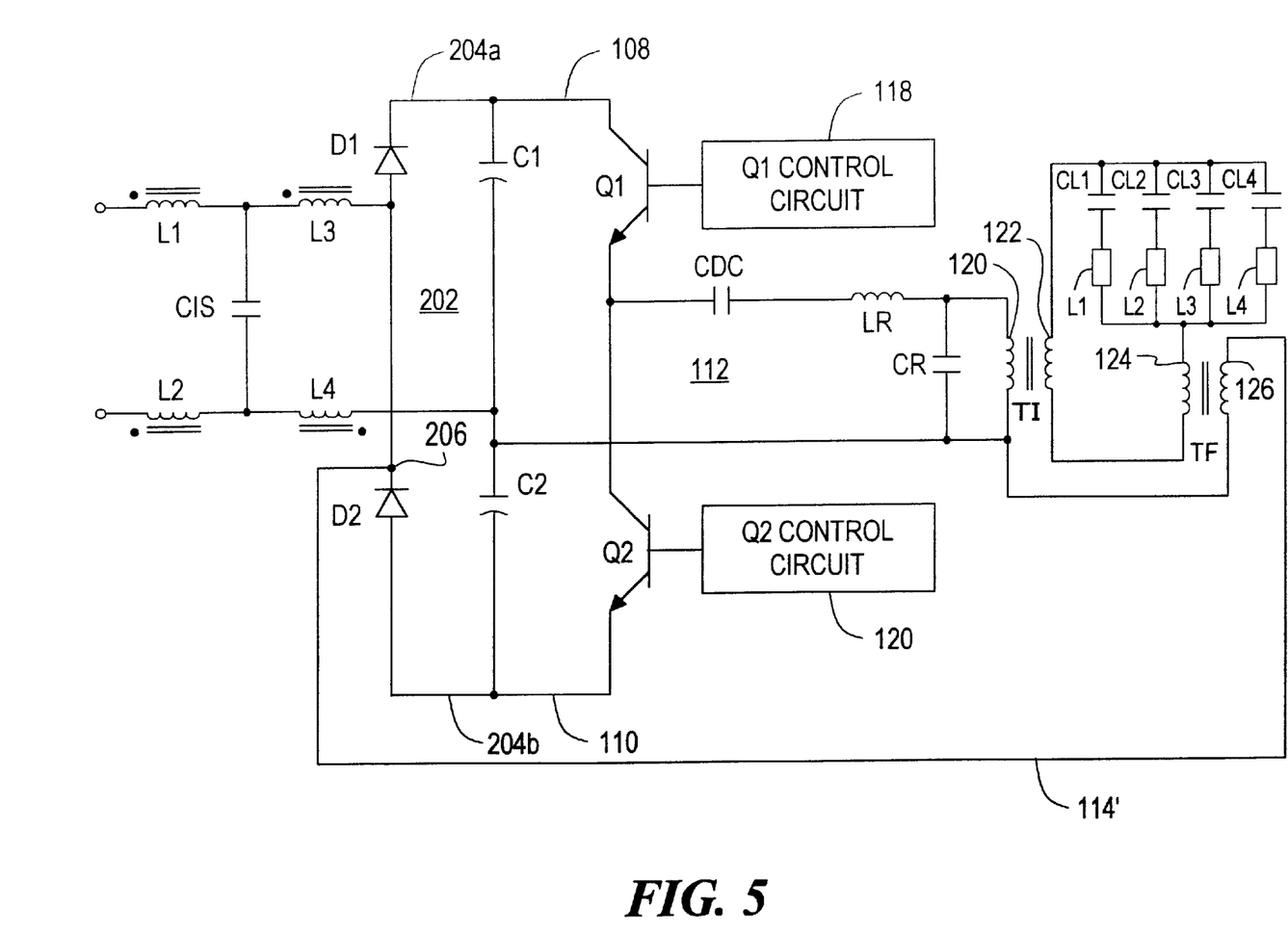
FIG. 5 is a circuit diagram of a further exemplary implementation of the circuit of FIG. 1.

FIG. 5 shows an exemplary ballast 200 having a so-called voltage doubler arrangement providing substantially linear diode operation. The ballast 200 includes a rectifier 202 having an input stage with first and second common mode inductors L1,L2, first and second differential mode inductors L3,L4, and a capacitor CIS. The rectifier 202 includes first and second rectifying diodes D1,D2 coupled across the DC output terminals 204$a,b$ of the rectifier. First and second capacitors C1,C2 are also coupled end-to-end across the output terminals 204 of the rectifier. As known to one of ordinary skill in the art, the voltage doubler arrangement is effective to roughly double the voltage of the incoming AC signal, as compared to the DC signals provided to the inverter.

The rectifier 202 provides DC energy to a resonant inverter 112 that generates an AC signal for causing the lamps L1–4 to emit light. The inverter 112 is substantially similar to the inverter shown in FIG. 2, wherein like reference numbers indicate like elements. The feedback signal path 114' extends from the second winding 126 of the feedback transformer TF to a point 206 between the first and second rectifying diodes D1,D2.

In operation, the feedback signal generated on the feedback signal path 114' is effective to periodically bias the first and second diodes D1,D2 to a conductive state. In an exemplary embodiment, the first diode D1 is periodically conductive during the positive portion of the AC input signal and the second diode D2 is conductive during the negative portion of the signal. The relatively high frequency associated with the lamp current causes a respective one of the rectifying diodes D1,D2 to become conductive many times during each halfcycle of the relatively low frequency AC input signal. It is understood that the duty cycle of the diodes D1,D2 corresponds to the operating frequency of the inverter.

The feedback transformer TF in combination with the feedback signal provide certain advantageous operating characteristics in addition to substantially linear diode operation. For example, the reactance of the lamp capacitors CL is substantially reduced due to the resonance with the feedback transformer. Thus, the load appears to be substantially resistive thereby increasing circuit efficiency. And by providing generally linear operation of the rectifying diodes D1–4, the efficiency of the circuit is further increased since more energy will flow directly from the energy source and less energy is transferred from the various circuit components. Further, in the case where the lamps are removed from the circuit, the feedback signal is substantially eliminated. This obviates apotential hazard associated with some known ballasts in that rail voltages can be driven to excessively high levels when lamps are removed from the ballast.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A circuit, comprising:
 a rectifier having a rectifying diode;
 a first circuit for energizing a load, the first circuit being coupled to the rectifier via a feedback signal path;
 a first energy-storing circuit element adapted for coupling in series with the load; and
 a feedback transformer having a first winding and a second winding, the first winding being adapted for coupling to a first one of the series-coupled load and first circuit element, and the second winding being coupled to the rectifying diode such that a resonance between the first circuit element and the first winding of the feedback transformer generates a signal on the second winding of the feedback transformer that corresponds to a feedback signal on the feedback signal path for providing substantially linear operation of the rectifying diode.

2. The circuit according to claim 1, wherein the first circuit element is a capacitor.

3. The circuit according to claim 1, wherein the circuit is a ballast circuit and the load is a lamp.

4. The circuit according to claim 1, wherein the rectifier is a full bridge rectifier.

5. The circuit according to claim 1, wherein the rectifier is a voltage doubling type circuit.

6. The circuit according to claim 1, wherein the inverter includes an isolation transformer.

7. The circuit according to claim 1, wherein the first circuit is a resonant inverter.

8. A ballast circuit for energizing a lamp, comprising:
 a rectifier having first and second rectifying diodes;
 a resonant inverter for providing an AC signal to the lamp, the inverter including
  an isolation transformer for limiting current to the lamp including a first winding coupled to a resonant inductive element and a second winding for coupling to the lamp;
 a lamp capacitor for coupling in series with the lamp;
 a feedback transformer having a first winding coupled between the lamp capacitor and the second winding of the isolation transformer and a second winding coupled to a point between the first and second diodes,
 wherein a feedback signal on the second winding of the feedback transformer provides substantially linear operation of the first and second rectifying diodes.

9. The ballast according to claim 8, wherein the second winding of the feedback transformer is coupled between the first winding of the isolation transformer and the point between the first and second diodes.

10. The ballast according to claim 9, wherein the rectifier includes an input filter including first and second common mode inductive elements and first and second capacitors coupled end-to-end across the common mode inductive elements.

11. The ballast according to claim 10, wherein the point between the first and second diodes is between the first and second capacitors.

12. The ballast according to claim 8, wherein the rectifier includes a voltage-doubler circuit.

13. A ballast circuit for energizing a plurality of lamps, comprising:
 a full bridge rectifier for receiving a relatively low frequency AC input signal at first and second AC input terminals and outputting positive and negative DC signals on first and second DC output terminals, the rectifier including first and second diodes coupled end-to-end across the DC output terminals of the rectifier and third and fourth diodes coupled end-to-end across the DC output terminals of the rectifier;
 a resonant inverter for receiving the positive and negative DC signals and energizing the plurality of loads with a relatively high frequency AC output signal, the inverter including an isolation transformer for limiting a current to the lamps, the isolation transformer having a first winding coupled to at least one resonant circuit element and a second winding for coupling to the lamps, the inverter further including a plurality of capacitors, each of which is adapted for coupling in series to a respective one of the plurality of lamps; and a feedback transformer for providing a feedback signal on a feedback signal path, the feedback transformer having a first winding for coupling to the lamps and a second winding, the feedback signal path extending from the second winding of the feedback transformer to a point between the first and second rectifying diodes and between the third and fourth rectifying diodes, wherein a resonance between the capacitors and the first winding of the feedback transformer generates the feedback signal on the second winding of the feedback transformer such that the rectifying diodes operate in a substantially linear manner.

14. The ballast according to claim 13, further including first and second capacitors coupled end-to-end between the AC input terminals of the rectifier, wherein the feedback signal path extends from a point between the first and second capacitors.

15. The ballast according to claim 14, wherein the second winding of the isolation transformer and the first winding of the feedback transformer are connected in series.

16. The ballast according to claim 15, wherein the second winding of the feedback transformer is connected between the first winding of the isolation transformer and the point between the first and second capacitors coupled end-to-end across the rectifier AC input terminals.

17. A ballast circuit for energizing a plurality of lamps, comprising:

a rectifier for receiving a relatively low frequency AC input signal at first and second AC input terminals and outputting positive and negative DC signals on first and second DC output terminals, the rectifier including first and second diodes coupled end-to-end across the DC output terminals of the rectifier and first and second capacitors coupled end-to-end across the DC output terminals of the rectifier so as to form a voltage doubler circuit;

a resonant inverter for receiving the positive and negative DC signals and energizing the plurality of lamps with a relatively high frequency AC output signal, the inverter including an isolation transformer for limiting a current to the lamps, the isolation transformer having a first winding coupled to at least one resonant circuit element and a second winding for coupling to the lamps, the inverter further including a plurality of capacitors, each of which is adapted for coupling in series to a respective one of the plurality of lamps; and a feedback transformer for providing a feedback signal on a feedback signal path, the feedback transformer having a first winding for coupling to the lamps and a second winding, the feedback signal path extending from the second winding of the feedback transformer to a point between the first and second rectifying diodes, wherein the a resonance between the capacitors and the first winding of the feedback transformer generates the feedback signal on the second winding of the feedback transformer such that the rectifying diodes operate in a substantially linear manner.

18. The ballast according to claim 17, wherein the second winding of the feedback transformer is coupled between the first winding of the isolation transformer and the point between the first and second rectifying diodes.

19. The ballast according to claim 17, wherein the rectifier includes an input filter including first and second common mode inductive elements, first and second differential mode inductive elements, and a filter capacitor having one end coupled between the first common mode inductive element and the first differential mode inductive element and the other end coupled between the second common mode inductive element and the second differential mode inductive element.

20. A method for providing substantially linear operation of rectifying diodes, comprising:

energizing a rectifier with an AC signal, the rectifier including a first diode;

coupling the rectifier circuit to an inverter circuit via a feedback signal path;

coupling a load to a charge-storing circuit element;

coupling a first winding of a feedback transformer to the load such that the load, the charge storing circuit element and the first winding of the feedback transformer resonate; and coupling a second winding of the feedback transformer to the feedback signal path such that the first diode operates in a substantially linear manner.

21. The method according to claim 20, wherein the rectifier is a full wave rectifier.

22. The method according to claim 20, wherein the rectifier includes a voltage doubler circuit.

23. The method according to claim 22, wherein the rectifier includes an input filter having common mode inductors and differential mode inductors, and a capacitor.

* * * * *